DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 4

T887,001

COMPOSITE ASSEMBLIES INCORPORATING THREE-DIMENSIONAL POLYMERS

Winston J. Jackson, Jr., and John R. Caldwell, both of P.O. Box 511, Kingsport, Tenn. 37901

Continuation of application Ser. No. 562,507, July 5, 1966. This application Dec. 18, 1969, Ser. No. 882,763

Int. Cl. B32b *27/06, 27/34*

U.S. Cl. 161—183

No Drawing. 22 Pages Specification

Composite assemblies comprising at least two structural members bonded together by an adhesive member composed essentially of a polymer of a bifunctional carboxylic acid and a bisphenol, said bisphenol having the following general formula:

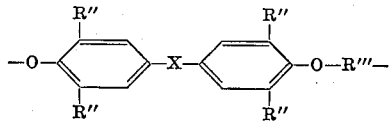

wherein each R″ is a substituent selected from the group consisting of a hydrogen atom, a halogen atom, and an alkyl radical containing from 1 to 4 carbon atoms, R‴ is the residue of a bifunctional carboxylic acid precursor having up to 40 carbon atoms and is selected from the group of precursors consisting of carbonic acid and dicarboxylic acids, and X is a gem-bivalent radical having a saturated polycyclic three-dimensional structure which includes a saturated bicyclic atomic bridged hydrocarbon ring member.